United States Patent [19]
Meyer

[11] 3,860,999
[45] Jan. 21, 1975

[54] FASTENER
[75] Inventor: Engelbert A. Meyer, Union Lake, Mich.
[73] Assignee: USM Corporation, Boston, Mass.
[22] Filed: May 3, 1973
[21] Appl. No.: 356,965

[52] U.S. Cl. .................................. 24/73 FT, 85/5 R
[51] Int. Cl. ...................... A44b 21/00, F16b 21/00
[58] Field of Search............. 24/73 P, 73 PF, 73 HS, 24/73 PM, 73 FT, 73 RM, 214, 213 CS, 213 R, 221 R, ; 85/5 R

[56] References Cited
UNITED STATES PATENTS
| | | | |
|---|---|---|---|
| 2,006,813 | 7/1935 | Norwood | 85/5 R |
| 3,029,486 | 4/1962 | Raymond | 24/73 HS |
| 3,037,596 | 6/1962 | Fordyce | 24/73 HS X |
| 3,309,955 | 3/1967 | Turnbull et al. | 85/5 R |

FOREIGN PATENTS OR APPLICATIONS
1,065,914  4/1967  Great Britain .................... 24/73 FT Primary Examiner—Donald A. Griffin
Attorney, Agent, or Firm—Burton & Parker

[57] ABSTRACT

A fastener for securing a trim panel member to a support, wherein the panel member and the support are provided with apertures in substantially axial alignment, the fastener including a shank portion engageable within the support aperture, and a head portion including a pair of spaced-apart, plate-like elements interconnected by a stem, the element remote from the shank having major and minor dimensions enabling free insertion of one smaller end freely through the panel aperture, and the longer dimension being appreciably greater than the dimension of the panel aperture, whereby upon assembly of the fastener with the panel, the panel is interposed between the two elements and is entrapped therebetween to retain the fastener.

1 Claim, 8 Drawing Figures

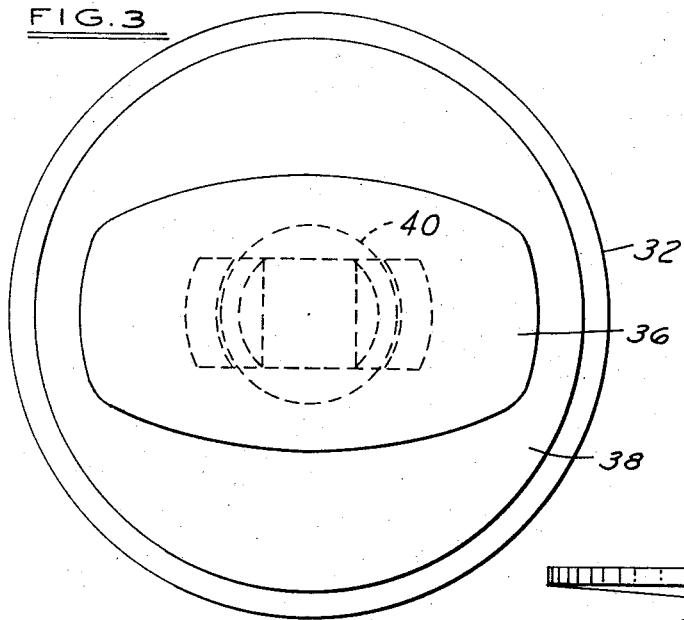
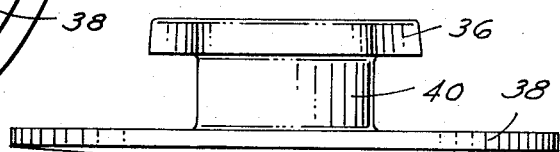
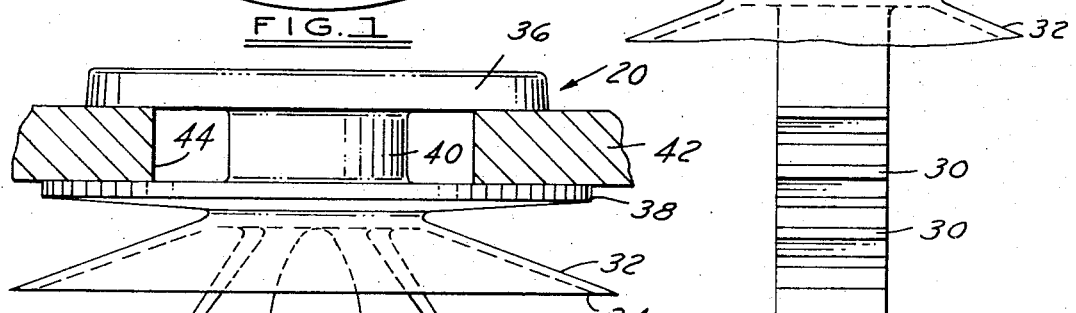
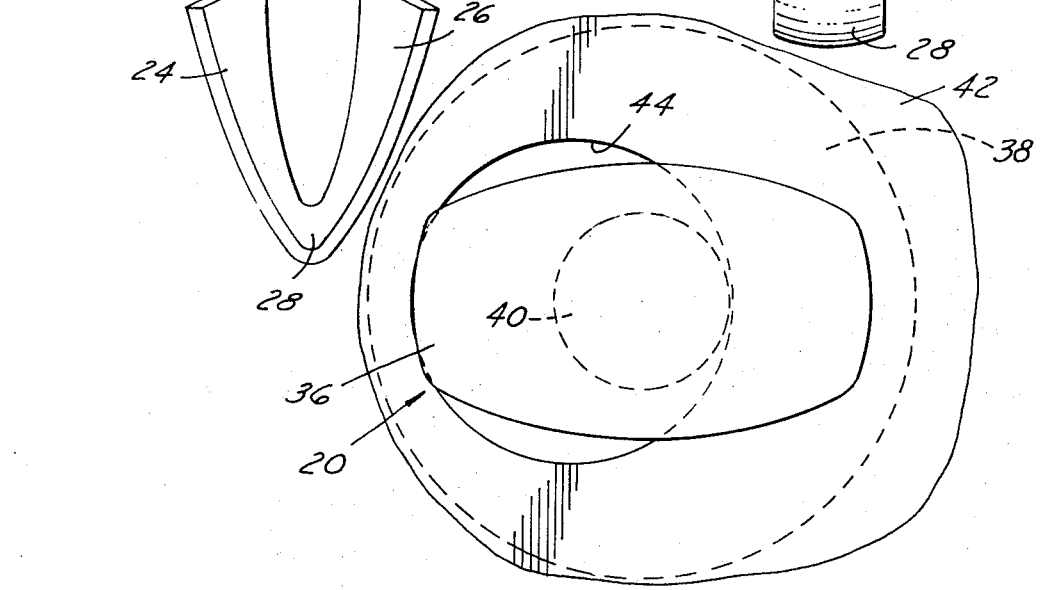

FASTENER

BACKGROUND OF THE INVENTION

1. Field of the Invention

The invention relates generally to the field of fasteners, and more particularly to a fastener having a head and a shank, with the shank adapted to be engaged within a hole in a support member, and the head engaged within an aperture in a panel which is to be secured to the support. The fastener disclosed herein is designed specifically for securing a panel to a support wherein the panel surface is covered with a decorative padding material. Such a construction is utilized in the automotive industry, wherein a decorative trim pad is secured to a panel member, which is in turn secured to the structural support of an automobile door or the like.

The fastener disclosed herein comprises a head portion which is lockingly secured within a panel structure, and a shank portion which is engaged within an aperture in the structural support member. The head portion of the fastener comprises a pair of flat, plate-like elements interconnected by a stem portion, with the plate-like elements overlying opposite surfaces of the panel member upon assembly of the fastener in the panel. The outermost head portion is dimensioned so as to be deformably receivable within the panel aperture, and upon assembly, to assist in preventing accidental dislodgment of the fastener from the panel.

In the construction of trim pad assemblies in the automobile industry, such as the assemblies which cover the interior surface of door panels and the like, panel members made out of a rigid material such as sheet metal or the like are covered with a decorative pad which is adhesively secured to the panel, and the resulting assembly is thereafter fastened to the structural portion of the automobile such as the door or the like. The trim pad itself may comprise a sponge-like material which is covered with a sheet of decorative material such as vinyl, and the trim pad is adhesively secured to the rigid or stiff panel, with the assembly thereafter being secured to the structural support by means of fasteners extending through suitable apertures in the support.

2. Description of the Prior Art

Fasteners comprising a head and a shank to secure a panel member covered with a decorative trim pad to a support are known in the art, as exemplified by U.S. Pat. Nos. 3,037,596 and 3,309,955. In the former patent, there is disclosed what might be termed a double-headed fastener having axially spaced head portions integrally connected, with the two head portions embracing the panel member therebetween upon assembly of the fastener with the panel. The fastener head portions shown in said patent are substantially circular, and are adapted to be used in conjunction with a panel member having an essentially T-shaped slot therein, with the fastener being assembled to the panel by insertion of the outermost head portion in the slot portion defining the head of the T, and thereafter shifting the fastener generally along the base of the T to embrace the panel between the two fastener head portions.

One serious drawback of the structure shown in Pat. No. 3,037,596, is that the fastener shown therein is adaptable for use only with slots which are T-shaped in configuration. Obviously, it is more difficult to form slots of this configuration in sheet metal than it is to form circular or rectangular apertures, resulting in an appreciable increase in the cost of fabrication. Moreover, the fastener must be specifically oriented with respect to the slot before it can be properly assembled, thus creating a time-consuming operation for the operator on the assembly line.

Pat. No. 3,309,955 also discloses a so-called double headed fastener wherein the outermost head portion is recessed radially inwardly on one side so that it can be inserted through a circular aperture in the panel by inclining the head and inserting through the aperture one of the two corners adjacent the recess, and twisting the head through the hole with a screwing action of one revolution. While this fastener permits the use of a circular aperture in the panel, the fastener itself is of comparatively complicated design, which requires a sophisticated manufacturing process, resulting in higher cost. Moreover, the assembly of the fastener within the panel aperture requires specific orientation of the fastener head with respect to the aperture, and also rotation of the fastener through substantially a complete revolution to insure proper engagement. This is an obvious disadvantage, in that the operator on the assembly line must insure that the fastener is rotated through 360° after being inserted into the panel aperture. Because one side of the panel is covered with a decorative trim pad, which overlies the fastener head portion, it is difficult for the operator to determine exactly when the fastener is properly assembled. If the operator does not rotate the fastener far enough, the assembly will not be complete, and the fastener will be subject to accidental dislodgment. On the other hand, it is possible for the operator to expend valuable production time rotating the fastener more than the requisite amount to positively insure proper assembly. The fastener disclosed herein obviates these and various other problems present in the prior art, while providing a positive connector which is not apt to become inadvertently dislodged from the panel member.

SUMMARY

A fastener for attaching a panel to a support, wherein the panel and support are provided with registering apertures, and the panel member is preferably covered with a decorative trim pad. The fastener comprises a head and a shank with the shank being receivable within the support aperture, and the head comprising a pair of spaced parallel plate-like portions interconnected by an axial stem portion. The head portion adjacent the shank overlies the marginal edges of the panel aperture in all positions of the fastener, while the portion remote from the shank has a minor dimension permitting free insertion of either end through the aperture, and deformable entry of the opposite end through the aperture upon manipulation of the fastener, with a marginal edge of said portion extending substantially to a marginal edge of the panel aperture in all positions of the fastener after assembly.

BRIEF DESCRIPTION OF THE DRAWING

FIG. 1 is a side elevation of a fastener embodying the invention having a head and a shank, with the shank being shown out of position to clearly illustrate its shape;

FIG. 2 is a side elevation of the fastener rotated 90° from FIG. 1;

FIG. 3 is a top elevation of the fastener;

FIG. 4 is a top elevation similar to FIG. 3 showing the fastener assembled in a panel aperture;

DESCRIPTION OF THE PREFERRED EMBODIMENTS

Figure 5:
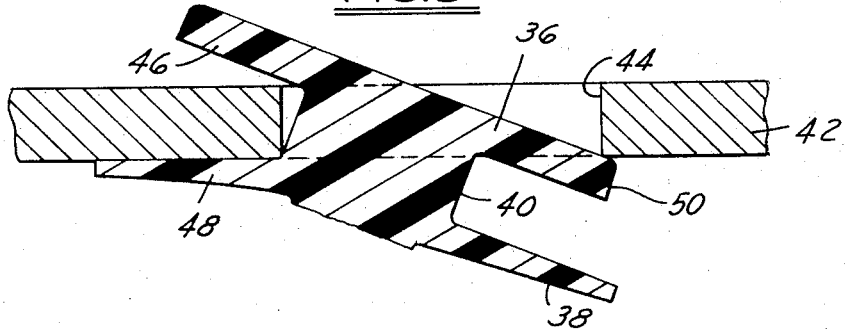
FIGS. 5, 6 and 7 are vertical sectional views taken through the fastener showing the steps in assembling the fastener into the panel member aperture.

In FIGS. 1-4 of the drawings, there is shown a fastener having a head 20 and a shank 22, the shank comprising a pair of spaced-apart, bowed legs 24 and 26 depending from the head 20 and joined together at their free end 28. The shank legs 24 and 26 are preferably diametrically opposed, but are shown out of position in FIG. 1 to more clearly illustrate their construction. The exterior surface of each leg is notched to provide a series of V-shaped teeth 30 as illustrated in FIG. 1, and the shank 22 is adapted to be received in a support aperture having a dimension less than the distance between the crests of opposed teeth 30, so that upon insertion of the shank through the aperture, the shank is deformed, then springs back to grippingly engage the marginal edges of the aperture, and thereby retain the fastener therewithin.

Also depending from the head 20 is a skirt portion 32 encircling the shank 22, the skirt being of substantially frusto-conical shape, and flaring outwardly and downwardly away from the head 20. Upon assembly of the fastener within a support aperture, the upper surface of the support abuts the lower surface 34 of the skirt 32, and upon complete insertion of the shank 22 within the support aperture, the flexible skirt 32 is deformed so as to sealingly engage the support surface completely surrounding the aperture within the support.

The head portion 20 of the fastener comprises a pair of spaced-apart, plate-like portions 36 and 38 which are in axial alignment, and which are interconnected by an axially extending stem or neck portion 40. The head portion 20 is adapted to be assembled on a trim panel member shown partially at 42 having an aperture 44 opening therethrough which is of regular shape, e.g. circular, square or rectangular. As can be seen from an examination of FIG. 1, the head portions 36 and 38 are spaced apart by the stem portion 40 a distance substantially equal to the thickness of the panel 42 so as to embraceably secure the panel member therebetween. In addition, the diameter of stem portion 40 is appreciably less than the dimension of the panel aperture 44, permitting limited radial adjustment of the fastener within the panel aperture. Thus, if there is any slight misalignment between the aperture 44 and the panel and the corresponding aperture in the support, the fastener may shift laterally to enable insertion of the shank 22 within the support aperture.

As can be seen most clearly from FIG. 3, the lower head portion 38, that is the portion adjacent the shank 22, is circular, said portion having a diameter sufficiently exceeding the dimensions of the panel aperture 44 so as to overlie the marginal edges of the panel aperture in all positions of the fastener. Referring to FIG. 4, there is shown the extreme condition wherein the stem portion 40 is shifted against one marginal edge of the aperture 44, and it can be observed from FIG. 4 that in this extreme position, the head portion 38 extends beyond the aperture 44 and overlies the panel surface extending completely around the aperture.

The upper head portion 36, i.e. the one remote from the shank 22, is of generally oval shape, and is of symmetrical shape. The head portion 36 has a major dimension appreciably in excess of the dimension of the panel aperture 44, and a minor dimension which is smaller than the panel aperture, as can be observed by an examination of FIG. 4. As shown therein, with the fastener assembled within the panel aperture 44, and shifted to one of its extreme positions with the stem 40 engaging the marginal edge of the aperture, the major dimension of the head portion 36 is such that the head portion extends substantially to the opposite marginal edge of the aperture 44 as shown. As will be pointed out hereinafter, with the relationship of the fastener and panel aperture as shown in FIG. 4, the fastener may be quite easily assembled on the panel, but is not subject to inadvertent dislodgment once properly assembled thereon.

In FIGS. 5 through 8, the method of assembling the fastener within the panel aperture is illustrated, only the head portion 20 of the fastener being shown therein. As shown in FIG. 5, the first step in the assembly of the fastener within the panel aperture comprises inserting either of the smaller end portions of the fastener head portion 36 through the aperture 44. For illustrative purposes the end portion inserted through the aperture has been shown at 46 in FIG. 5, and it will be apparent from an examination of such Figure that to insert the end 46 through the aperture 44, the corresponding portion shown at 48 of the head portion 38 must be resiliently deformed by engagement against the lower surface of the panel 42. Once the fastener head is inserted through the aperture to the extent shown in FIG. 5, the remaining end 50 of the head portion 36 abuts the marginal edge of the aperture 44 as shown.

Figure 6:
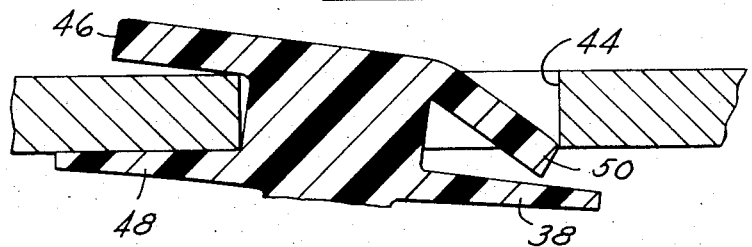
Figure 7:
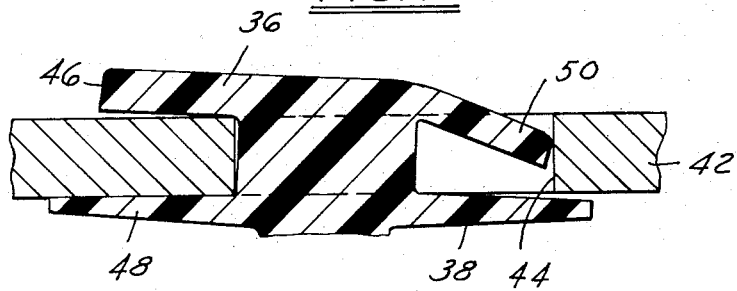

In FIG. 6, force has been applied to the fastener urging it to rock by comparing FIG. 5 with a counterclockwise direction as shown in FIG. 6, whereby the end portion 50 of the head 36 is resiliently deformed to enter the aperture 44. In FIG. 7, the end portion 50 is shown still in its deformed position, having passed part way through the aperture 44, due to the counterclockwise force exerted on the fastener as above described. In this position, the fastener may be fully assembled within the aperture by slightly twisting the fastener about its axis while exerting the aforementioned force thereon, until the fastener assumes the completely assembled position shown in FIG. 8.

Figure 8:
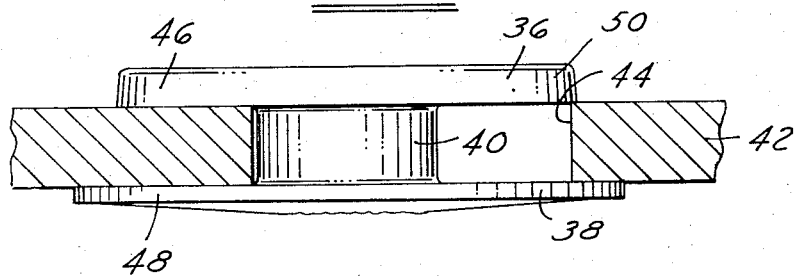
FIG. 8 is a partial elevation, partly in section, showing the relationship of the fastener head to the panel after complete assembly.

The relationship of the fastener and the panel aperture shown in FIG. 8 corresponds to that shown in FIG. 4 in that the stem portion 40 of the fastener head is shifted to its extreme position against a marginal edge of the aperture 44, albeit the opposite marginal edge. As can be seen, the end 50 of the head portion 36 diametrically opposite to the engagement of the stem portion 40 and the marginal edge of the aperture 44 extends substantially to, and may slightly overlie, the panel surface adjacent the aperture marginal edge. It has been found that with the head portion 36 extending substantially to the aperture marginal edge, there is no possibility of the fastener becoming inadvertently dislodged from the aperture, and as a matter of fact, even intentional withdrawal of the fastener is practically impossible unless appreciable force is applied to the end portion 50, while at the same time the fastener is rocked in clockwise direction from the position shown in FIG. 8.

As previously stated, the fastener above described embodying the invention is adapted specifically for use in the automotive industry in what is commonly referred to as a trim pad assembly. Such an assembly is used in the automobile interior to cover the structural portions of the automobile body with decorative pads covered with vinyl or the like. For example, a sheet metal panel such as shown partially at 42 in the drawings is provided which conforms substantially in shape to the interior surface of the automobile door structure, and the panel is covered with a padding material having a decorative vinyl surface or the like. Such padding is applied over the upper surface of the panel 42 shown in FIGS. 1 and 5 through 8, as by being adhesively secured thereto.

Prior to the application of the padding, the panel 42 is provided with a plurality of apertures 44 in a predetermined pattern, the holes generally being formed in spaced relation adjacent the marginal panel edges. The structural member of the automobile, such as a door or the like, is also provided with apertures corresponding in number and location to the panel apertures 44. One of the fasteners is thereafter inserted within each of the panel apertures, in the manner above described, and the assembly of panel, padding material and fasteners is ready for assembly onto the door structure. Assembly is easily and conveniently effected by merely aligning the panel with the structural supporting member so that each fastener is disposed in alignment with a structural aperture and thereafter forcing the fastener shanks into the apertures.

What is claimed is:

1. A trim panel fastening assembly including a panel member having one or more regular or symmetrically-shaped apertures therethrough and further including a one-piece fastener for each such aperture made wholly of resiliently deformable hardened plastic material;

each said fastener comprising axially aligned, integrally connected head and shank sections with said head section insertably installed in said aperture of the panel member and with the shank section thereof projecting from the panel member for engagement within an aperture in a supporting member for attaching the panel member thereto;

said head section comprising a pair of axially-spaced apart plate-like elements interconnected by a cross-sectionally reduced axially-extending neck portion, the plate-like elements extending perpendicular to the axis of the head and shank sections of the fastener;

a frusto-conical skirt element integrally connected to the plate-like element of the head section adjacent to the shank section and flaring outwardly and downwardly away therefrom, said skirt element being resiliently deformable and adapted to be yielding pressed against the margin of the supporting member surrounding the aperture into which the shank section is inserted to provide a seal therearound when the fastener has properly attached the panel member thereto;

the plate-like element of the head section adjacent to said shank section being generally circular in shape and having a diameter appreciably greater than the maximum dimension of the panel aperture and being spaced from the other plate-like element a distance substantially equal to the thickness of the panel member whereby the confronting faces of the two elements engage opposite surfaces of the panel member;

the plate-like element of the head section remote from said shank section being generally oblong in shape and having a minor dimension slightly less than the minimum dimension of the panel aperture and a major dimension appreciably greater than the maximum dimension of the panel aperture, the sum of the radius of said neck portion and the distance of the neck axis to the most distant point of said oblong element being substantially equal to the maximum dimension of the panel aperture, thereby enabling the free insertion of one smaller end of said oblong element through the panel aperture and the deformable reception of the opposite smaller end of the oblong element upon forceable rocking and twisting motion of the fastener into such aperture until said opposite end passes completely through the panel aperture for engagement with the inside marginal edge of the panel member surrounding the aperture thereby retaining the fastener in all positions within the aperture; and said shank section comprising at least two spaced apart outwardly bowed leg portions integrally joined together at their free ends, each leg portion being correspondingly notched on its respective exterior surface to provide a series of V-shaped teeth such that when the shank section is inserted into an aperture of the supporting member the leg portions are resiliently contracted toward one another by the marginal edges of the aperture and the crests of the teeth grippingly engage these marginal edges thereby to retain the shank of the fastener within the aperture for securely attaching the panel member to the supporting member.

* * * * *